(12) United States Patent
Cherunni

(10) Patent No.: US 11,201,783 B2
(45) Date of Patent: Dec. 14, 2021

(54) ANALYZING AND CONFIGURING WORKLOAD DISTRIBUTION IN SLICE-BASED NETWORKS TO OPTIMIZE NETWORK PERFORMANCE

(71) Applicant: VMware, Inc., Palo Alto, CA (US)

(72) Inventor: Vinod Anthony Joseph Cherunni, Singapore (SG)

(73) Assignee: VMware, Inc., Palo Alto, CA (US)

( * ) Notice: Subject to any disclaimer, the term of this patent is extended or adjusted under 35 U.S.C. 154(b) by 259 days.

(21) Appl. No.: 16/452,996

(22) Filed: Jun. 26, 2019

(65) Prior Publication Data

US 2020/0412612 A1    Dec. 31, 2020

(51) Int. Cl.
*G06F 15/173* (2006.01)
*H04L 12/24* (2006.01)

(52) U.S. Cl.
CPC .......... *H04L 41/0823* (2013.01); *H04L 41/04* (2013.01)

(58) Field of Classification Search
CPC .. H04L 41/0823; H04L 41/04; H04L 67/1012
USPC ................................. 709/223–224
See application file for complete search history.

(56) References Cited

U.S. PATENT DOCUMENTS

| | | | |
|---|---|---|---|
| 9,954,693 B2* | 4/2018 | Sergeev | H04L 49/3009 |
| 10,057,109 B2* | 8/2018 | Shatzkamer | H04L 41/04 |
| 10,572,650 B2* | 2/2020 | Cooper | H04L 41/5009 |
| 10,931,507 B2* | 2/2021 | Cherunni | H04L 41/04 |
| 10,944,635 B2* | 3/2021 | Yousaf | H04L 41/0893 |
| 2017/0142591 A1* | 5/2017 | Vrzic | H04L 67/303 |
| 2018/0262389 A1* | 9/2018 | Soderlund | H04L 41/0806 |
| 2019/0215235 A1* | 7/2019 | Chou | H04L 41/0681 |
| 2019/0281588 A1* | 9/2019 | Zhang | H04W 52/08 |
| 2020/0213937 A1* | 7/2020 | Yang | H04L 41/0823 |
| 2020/0296186 A1* | 9/2020 | Lau | H04L 41/16 |
| 2021/0051077 A1* | 2/2021 | Dempo | H04L 41/0806 |

* cited by examiner

*Primary Examiner* — Bharat Barot
(74) *Attorney, Agent, or Firm* — Clayton, McKay & Bailey, PC

(57) ABSTRACT

A system incorporated in a slice-based network can implement a first virtual infrastructure manager ("VIM") at a first region. The first VIM can be associated with a first internet protocol ("IP") prefix range, and configured to receive a second IP prefix range associated with a second region having a second VIM. For compliance with requirements from a software license agreement ("SLA"), the first VIM can monitor a performance of a first virtual network function ("VNF") of a network slice. In the event of a performance threshold violation, the first VIM can map portions of a workload associated with the violated threshold to the first region and the second region based on respective workload flow data associated with each of the first and second IP prefix ranges. The first VIM can instantiate a second VNF in the region having a workload portion that corresponds to a higher network resource consumption.

20 Claims, 7 Drawing Sheets

ANALYZING AND CONFIGURING WORKLOAD DISTRIBUTION IN SLICE-BASED NETWORKS TO OPTIMIZE NETWORK PERFORMANCE

BACKGROUND

Today's 3G, 4G, and LTE networks operate using multiple data centers that can be distributed across clouds. These networks are centrally managed by only a few operating support systems and network operations centers. 5G technology will dramatically increase network connectivity for all sorts of devices that will need to connect to a Telco network and share the physical network resources. Current network architectures cannot scale to meet these demands.

Network slicing is a form of virtualization that allows multiple logical networks to run on top of a shared physical network infrastructure. A distributed cloud network can share network resources with various slices to allow different users, called tenants, to multiplex over a single physical infrastructure. For example, Internet of Things ("IoT") devices, mobile broadband devices, and low-latency vehicular devices may all need to share the 5G network. These different use cases will have different transmission characteristics and requirements. For example, the IoT will typically have a large number of devices but very low throughput. Mobile broadband will be the opposite, with each device transmitting and receiving high bandwidth content. Network slicing can allow the physical network to be partitioned at an end-to-end level to group traffic, isolate tenant traffic, and configure network resources at a macro level. Accordingly, slice-based networking may enable dramatic increases in network usage.

In a slice-based network, a slice may be reserved for certain types of traffic and responsible for carrying out certain network tasks. A slice may implement a service chain of virtual network functions ("VNFs") for performing the certain network tasks the slice is responsible for. The required combination of VNFs can differ based on an intended use of the slice.

An overall performance of a slice-based network may be impacted by performance characteristics of individual slices. An individual slice may be subject to performance requirements set out as key performance indicators ("KPIs") in a software license agreement ("SLA") or multiple SLAs. Operational elements of individual slices may be associated with common metrics, such as data throughput and latency. However, current systems lack the ability to pinpoint and optimally address slice-specific operational aspects that hold back or hinder performance of a respective slice-based network based on these metrics.

For example, the timely placement of a VNF in a location that is proximate to a physical location of a source of a particular network workload, can critically affect the performance of a slice that implements that VNF. As one of ordinary skill in the art will recognize, locating a VNF in close proximity to where a workload is physically generated, may reduce latency and increase data throughput. Yet, network slicing alone does not provide for reliable and optimal placement of workloads or VNFs at locations where, and at times when, it is critical. This issue generally stems from slice-managing components of slice-based networks, such as a virtual infrastructure manager ("VIM"), not being implemented with visibility of, nor access to, resources of other slice-managing components. As a result, virtual resources for a slice-based network may be not be allocated to optimal locations in a way that maximizes network performance while minimizing network resource usage.

Another example of a limitation common to current systems is a lack of optimization of physical resources associated with virtual layers of individual network slices. Network slices usually comprise both virtual and physical domains. In the case of a VNF implemented by a combination of domains, both of the domains are likely to be part of a network data traffic path for the VNF. This may be considered a decoupled virtualized infrastructure, where command-and-control of the VNF may be hosted as a virtual machine, while a physical device exists and is doing an actual forwarding of traffic.

The decoupling of the command and control from the forwarding path effectively compartmentalizes the control of a physical device from the device's operation, and may yield many operational efficiencies. However, with respect to a VIM for a slice, this can create a "blind spot" as to additional resources available to the physical device, and thus to the slice being incorporated by the VIM. This hinders VIM management of and prevents optimal distribution on the virtual and physical domains. More specifically, a VIM often cannot effectively shift or portion workloads to virtual and physical domains based on precise assessments or estimates of respective capacities or available bare metal physical resources.

As a result, a need exists for systems that instantiate virtual resources for slice-based networks in locations based on physical proximity to sources of network traffic. In addition, a need exists for systems that manage lifecycles of network slices by optimally distributing workloads between virtual and physical resources.

SUMMARY

Examples described herein include systems and methods for instantiating virtual resources for slice-based networks in locations based on physical proximity to sources of network traffic, and optimally distributing workloads between virtual and physical resources. A slice-based network can be divided into slices to accommodate different use cases for one or more tenants. Each slice can have required SLA performance attributes, such as threshold levels of latency, throughput, bandwidth, round-trip time, and others. Further, each network slice can be maintained at a site in a specific region, and carry data (otherwise referred to as servicing network traffic or handling workloads) from multiple end devices, such as phones, cars, and IoT devices located in the same region or different regions.

In one example, a first VIM at a first region can be associated with a first internet protocol "IP" prefix range, and configured to receive a second IP prefix range that is associated with a second region having a second VIM. The first and second VIMs can be hosted and maintained at first and second sites respectively located in the first and second regions, and be part of an Openstack® federation. Each of the sites can obtain information specific to the other site, such as the first and second IP prefix ranges, through a discovery process known as "region discovery." This process may be provided as a service of an inter-cloud resource federation ("ICRF") that includes the first and second sites. With this federated infrastructure, each of the first and second sites may be a resource provider for a given network slice.

The first VIM can monitor performance of a first VNF of a network slice to determine if performance thresholds are being exceeded. VNFs of network slices may be defined to meet specific maximum data throughputs using processing resources. In one example, a system according to the present disclosure may utilize specific, but non-standard, performance measures to reference along with core metrics, such as throughput and latency, to evaluate individual VNF performance. In one example, at least a TCP window size associated with a throughput for VNF may be used to determine a memory utilization for the VNF. In one particular example, a VIM can monitor a throughput and latency of a VNF, derive a TCP window size from the throughput, determine a memory utilization according to the TCP window size and a buffer size of an associated network slice.

In the event a performance threshold is violated, a VIM at a first region can map portions of a workload associated with the violated threshold to regions in a federation. In one example, portions of the violative workload can be attributed to regions based on workload flow data associated with respective IP prefix ranges. In particular, the VNF may have access to IPFIX records that provide source subnet traffic to total VNF traffic ratio data. A VIM can cross-reference the IPFIX records with IP prefix range information obtained for other regions/sites during a region discovery process for a federation including a site that hosts the VIM. In turn, the VIM can determine whether a local scale out of a VNF instance, or a remote instantiation at another site will optimize a performance of a slice-based network in which the VIM is incorporated.

Thus, a VIM can identify source-to-VNF traffic, and determine that a region ("foreign region") other than a region that maintains a threshold-violating VNF ("home region"), is a source of an amount of traffic that should not be serviced by the home region. In particular, the VIM may recognize one or more rules that specify a maximum consumption of VNF capacity for a foreign region. Based on this evaluation, the VIM can instantiate, or cause an instantiation of, another VNF in the foreign region. More specifically, the VIM can instantiate, or cause instantiation of, a new VNF at a site in a foreign region where the VIM and threshold-violating VNF are not maintained; but one that is physically closer to a source of a workload portion that is disproportionately (at least with respect to traffic from the home region) responsible for a violation a performance threshold.

In one example, a VIM may communicate with a management and orchestrator ("MANO" or "orchestration service") to cause a VNF instance to be instantiated at site in an appropriate location (region), and cause network traffic to be directed to the new VNF. In particular, the VIM may carry out an assignment process for distributing portions of a workload to a region that includes, or will include, a VNF that the VIM determines is optimally located to ensure a performance threshold does not continue to be violated. In one example, a VIM can communicate the workload assignments (distributions) to an orchestration service for a slice-based network that controls where and how much network traffic is directed to specific components of the network.

In yet another example, a system according to the present disclosure may be configured to manage network traffic flow to a physical resource for which a respective control plane is implemented as a VNF; or any other combination of a physical resource and a virtual resource that cooperatively implement a network function. In one example, a VIM can determine a violation has occurred for a performance threshold that is associated with a virtual resource that provides a physical resource control virtual network function ("PVNF") configured to virtualize a control plane of at least a portion ("bare metal component") of a physical resource ("bare metal device"). Thus, command and control can be decoupled from the actual physical hardware encompassed by the bare metal component, which forwards network traffic for a network slice incorporating that bare metal component.

Even with this decoupling, a VIM according to the present disclosure can determine whether additional hardware resources of the bare metal device can be added to the bare metal component, and therefore exist as a resource with respect to the PVNF. Further, in one example, if additional hardware is available, the VIM can partition the bare metal device and allocate the available hardware to the bare metal component in response to a violation of a performance threshold for the PVNF. In another example, the VIM can shift workload from the PVNF to an existing VNF, or instantiate a new VNF in a location proximate to a source of a threshold violating portion of a workload, to ensure the performance threshold is no longer violated.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a system incorporated in a slice-based network can implement a first VIM at a first region. The first VIM can be associated with a first IP prefix range, and be configured to receive a second IP prefix range that is associated with a second region having a second VIM. For compliance with requirements from an SLA, the first VIM can monitor a performance of a first VNF of a network slice. In the event of a performance threshold violation, the first VIM can map portions of a workload associated with the violated threshold to the first region and the second region. The mapping can be based on respective workload flow data associated with each of the first and second IP prefix ranges. The first VIM can instantiate a second VNF in the region having a workload portion that corresponds to a higher network resource consumption. Network resource consumption in this case referring a proportionality between: (A) a portion of total computing resources represented by a VNF required to meet a demand of a total workload (total network traffic) generated from a plurality of regions; and (B) a portion of the total workload (portion of total network traffic coming from) generated by each region respectively.

In another example, a VIM at a first region can determine: (A) a performance threshold is violated with respect to a virtual resource that executes, as a PVNF, a command and control of a bare metal component; and (B) whether additional hardware resources exist for the PVNF. According to the present disclosure, the VIM can cause available hardware resources to be allocated to the bare metal component, and thus the PVNF, in order to satisfy performance requirements. In turn, a performance threshold may no longer be violated. In another example, the VIM can determine additional hardware resources are not available to the bare metal component, and can shift a portion of a workload associated with the violated threshold to an existing VNF at a first region including the PVNF. In another example, the VIM can cause a VNF to be instantiated at a second region that is proximate to a source of a portion of the workload that is disproportionately contributing to the violation of the performance threshold with the PVNF.

Figure 1:
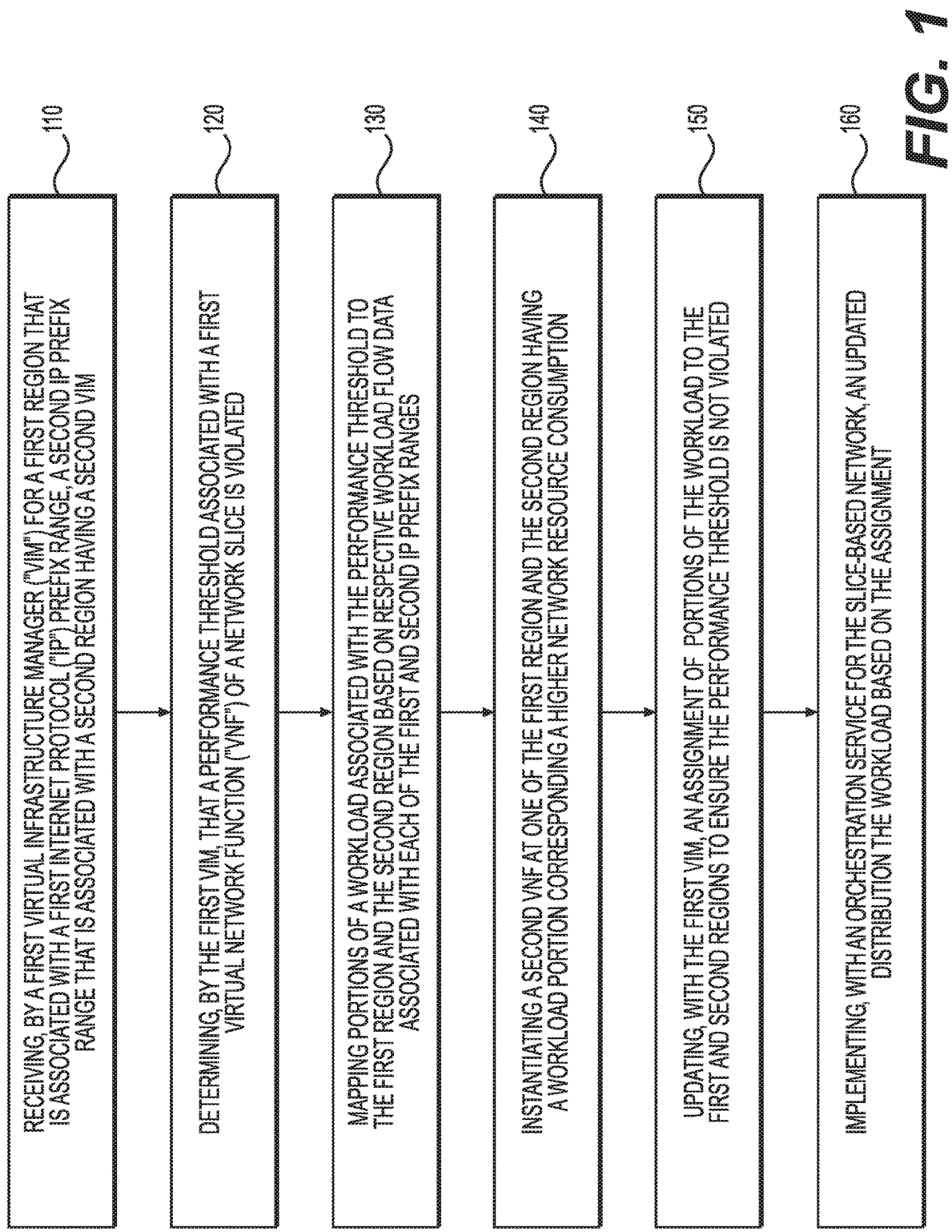
FIG. 1 is a flowchart of an example method for analyzing and configuring workload distributions in slice-based networks to optimize network performance.
Figure 2:
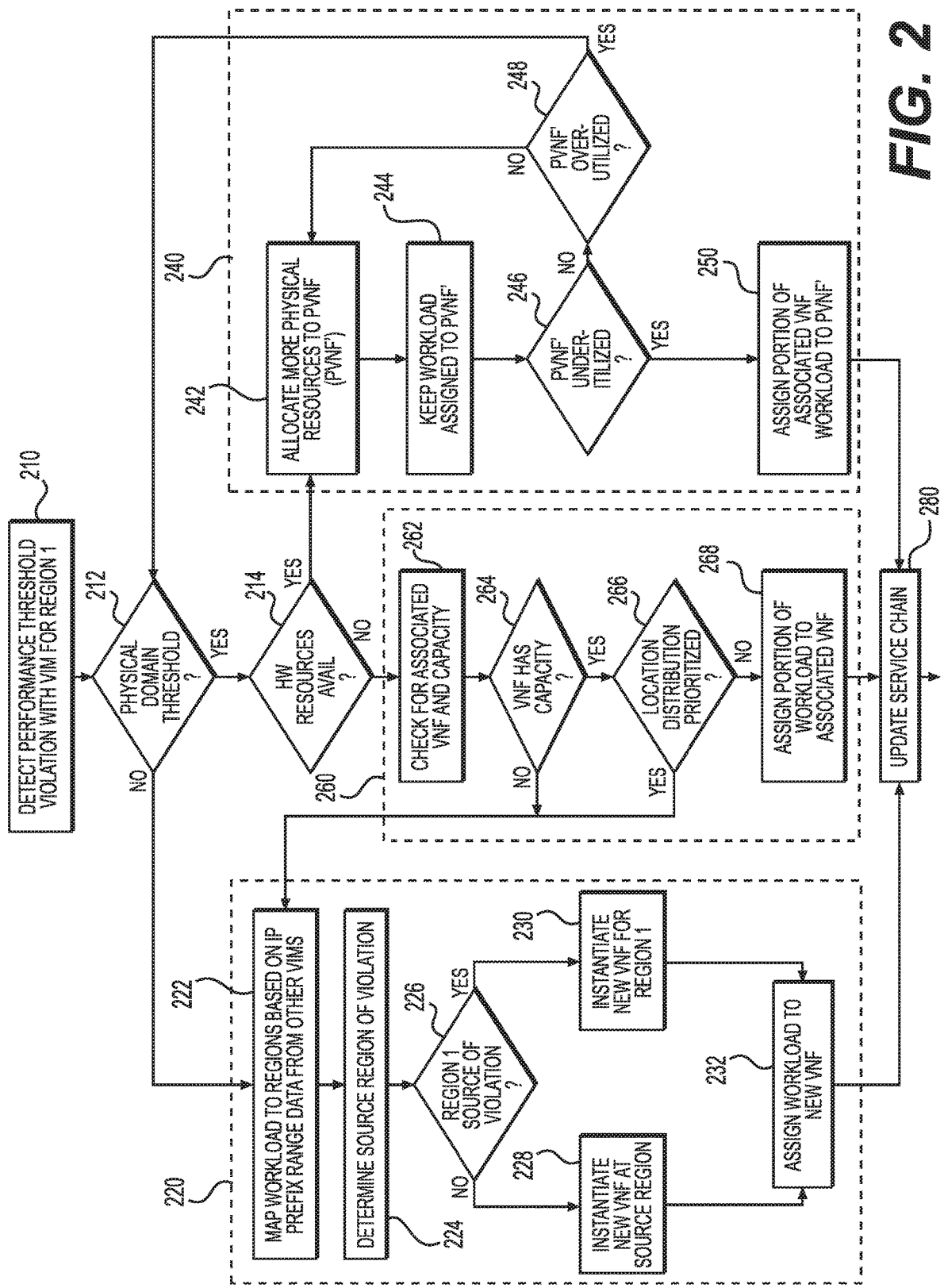
FIG. 2 illustrates a flowchart for an exemplary method for analyzing and distributing workloads to optimize performance of slice-based networks.
Figure 3:
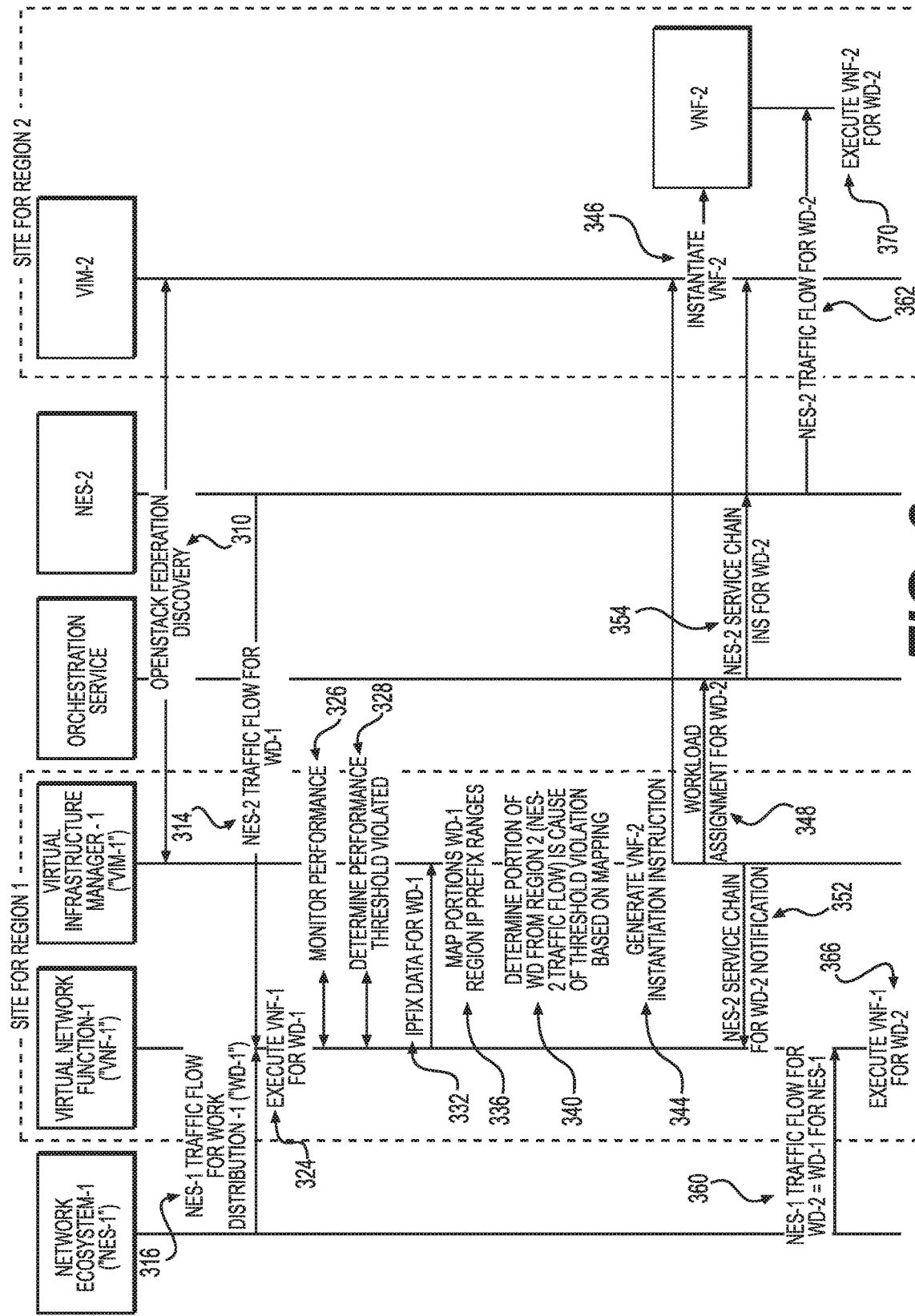
FIG. 3 is a sequence diagram of an example method for instantiating VNFs in a region that is in an optimal geographic location relative to a network threshold violating workload.
Figure 4:
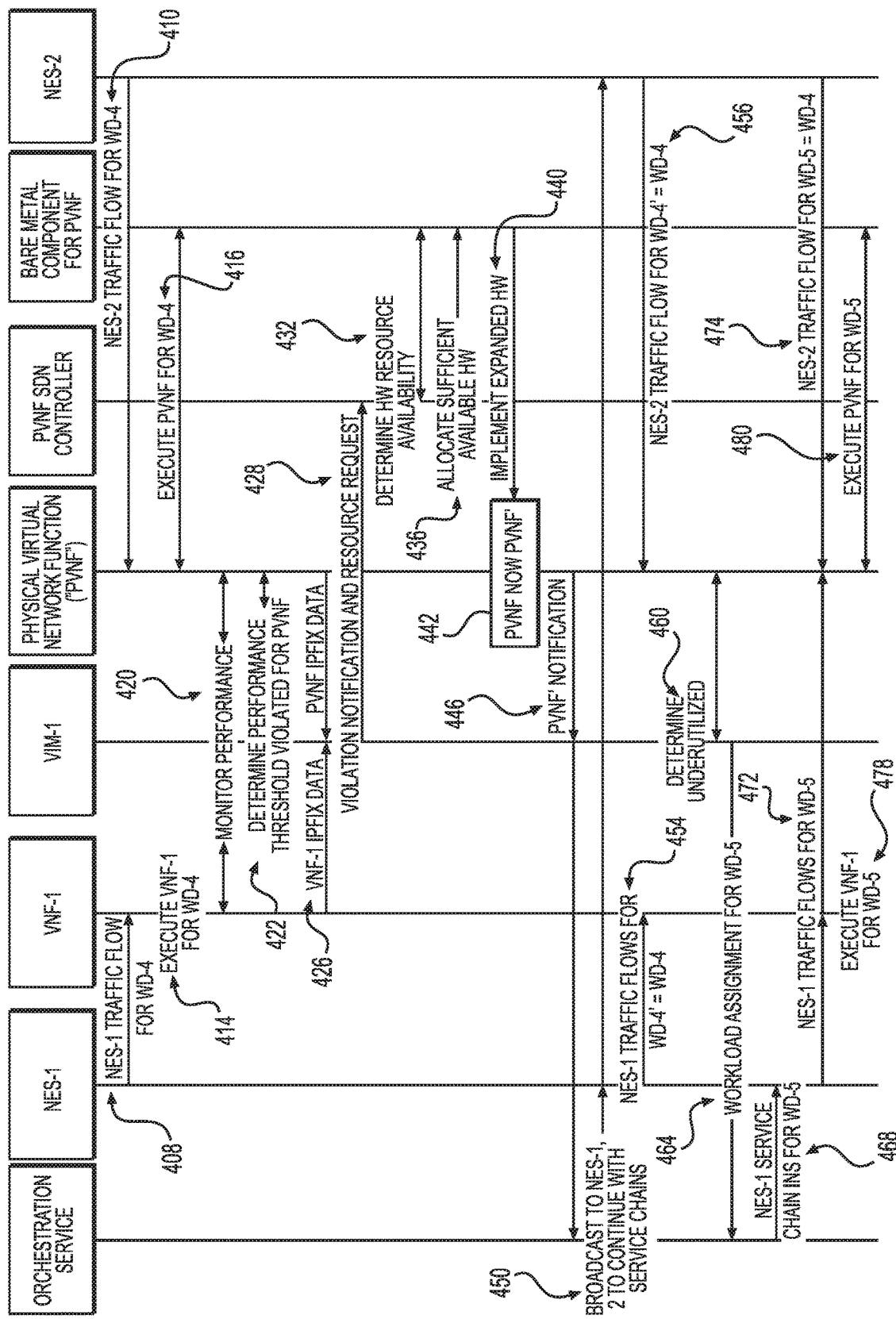
FIG. 4 is a sequence diagram of an example method for efficiently utilizing bare-metal hardware resources incorporated in a slice-based network relative to virtual resources.
Figure 5:
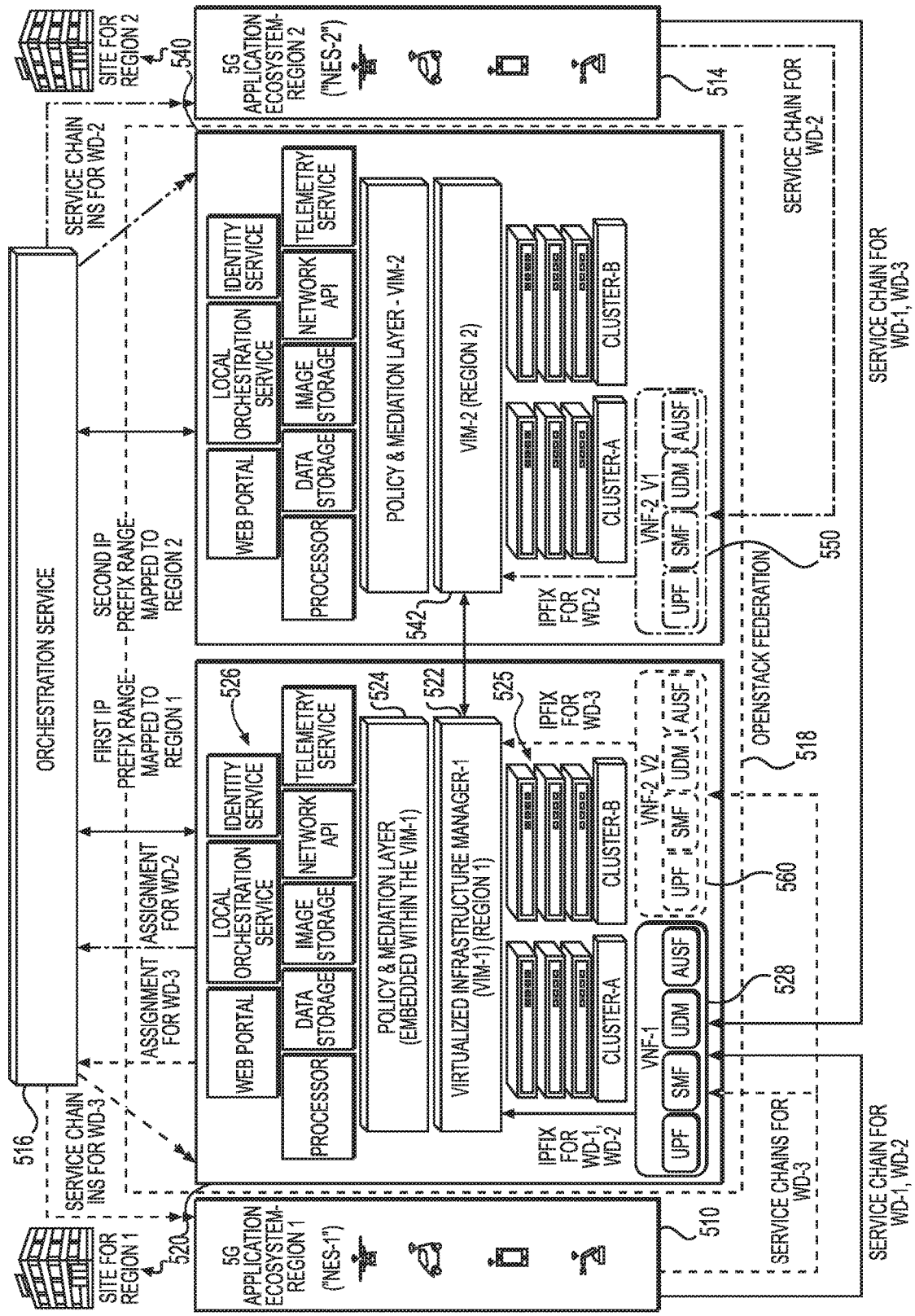
FIG. 5 illustrates a schematic representing exemplary system components and communications between system components for analyzing and configuring workload distributions in slice-based networks based on workload proximity.
Figure 6:
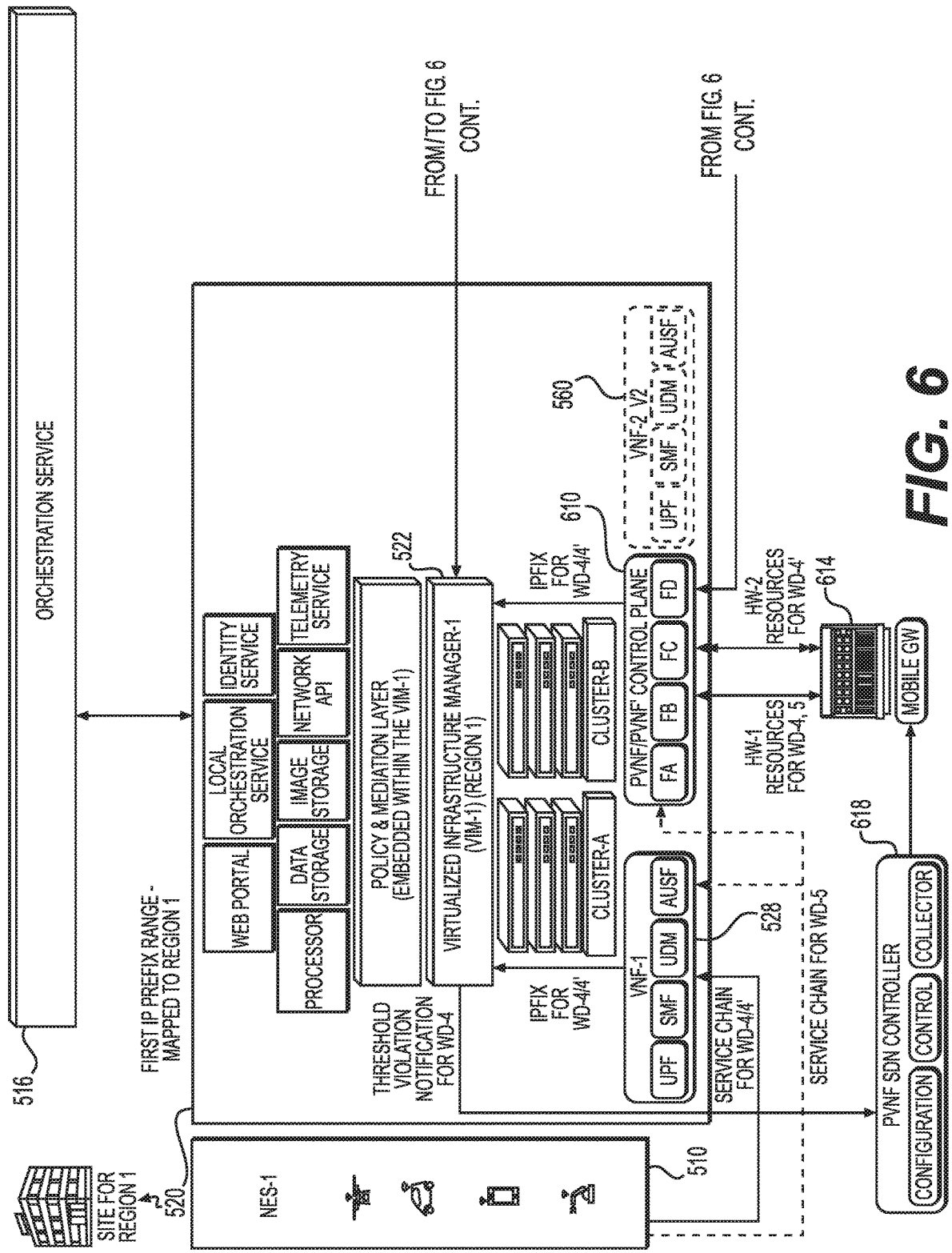
FIG. 6 illustrates a schematic representing exemplary system components and communications between system components for analyzing and configuring workload distributions in slice-based networks based on an optimization of available hardware resources.
Figure 6:
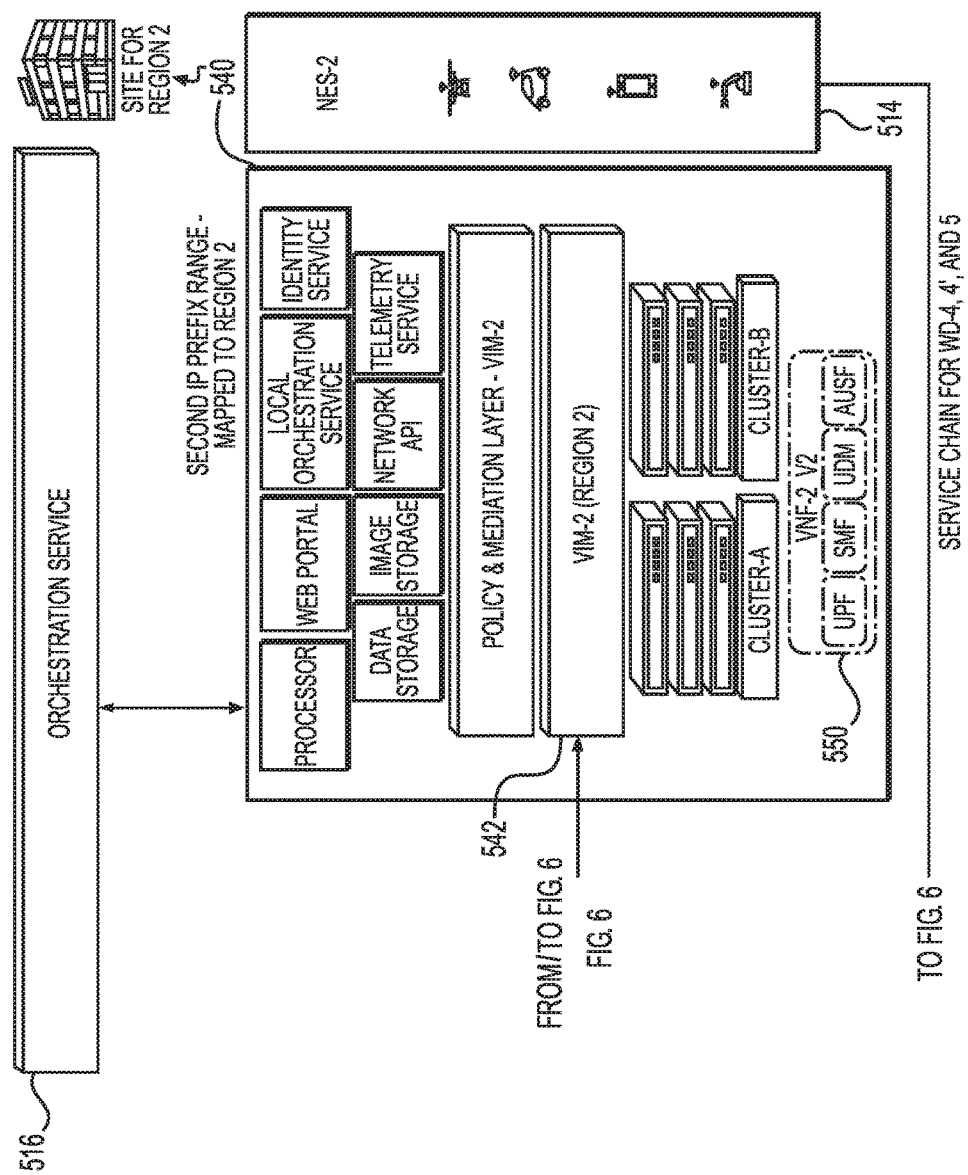

FIG. 1 is a flowchart of an example method for determining a performance threshold for a VNF in a slice-based network is violated, and configuring a workload distribution to optimize network performance. FIG. 2 illustrates an algorithmic flowchart for a method of updating a service chain for handling network traffic in accordance with at least one network resource capacity sub-analysis. FIG. 3 provides a detailed sequence diagram for an aspect of the methods of FIGS. 1 and 2 directed toward instantiating a VNF based on proximity to one of at least two regions having a higher network resource consumption related to a performance threshold violation. FIG. 4 provides a detailed sequence diagram for a portion of the method of FIG. 2 that includes utilizing available bare metal resources to address a performance threshold violation. FIGS. 5 and 6 illustrate schematics representing exemplary system components and communications between system components for implementing the methods described herein. In particular, the schematics of FIGS. 5 and 6 may represent system components that respectively communicate as an orchestration platform and one or more VIMs in a federated network infrastructure. In one example the system components communicate to analyze and configure workload distributions in slice-based networks based on workload proximity and an optimization of available hardware resources.

FIG. 1 is an example method with stages performed by network sites in an Openstack® federation for a slice-based network.

A slice-based network may be defined as a distributed cloud network that can share network resources through a form of virtualization that allows multiple logical networks to run on top of a shared physical network infrastructure. The slice-based network may function to partition a physical network at an end-to-end level to group traffic, isolate tenant traffic, and configure network resources at a macro level. A network slice may be cloud-based virtualized component of the slice-based network that is reserved for certain types of traffic and responsible for carrying out certain network tasks. A network slice may implement a service chain of virtual network functions ("VNFs") for performing the certain network tasks the network slice is responsible for. The required combination of VNFs can differ based on an intended use of the network slice.

In one example, a VNF can refer to network architectures that virtualize network node functions. A VNF can host virtual machines ("VMs"), or represent a virtual controller, virtual router, virtual interface, virtual local area network ("VLANs"), or other virtualized network functions that run on top of physical hardware, such as servers connected by switches. The VNFs can be connected to one another to create multi-part VNFs for network service chaining. Service chaining can refer to a sequence of network services (such as firewalls, network address translation, intrusion protection, etc.) that are connected in a virtual chain.

VNFs can allow content service providers ("CSPs") to deploy complex network functions and services in distributed networks. The CSPs can model network topologies and construct network functions to include both virtual and physical network elements. A Telco network, for example, can be divided into slices for different tenants, each slice including a service chain of VNFs.

In the context of a slice-based network, a VIM may be implemented using Openstack® to manage hardware and software resources that a service provider uses to create service chains and deliver network services to users. Each network slice of a slice-based network may include a VIM that can manage the allocation, upgrade, release, and reclamation of infrastructure resources and optimize their use.

A MANO may use underlying VIMs for implementing VNF services according to service requirements. For example, a relatively complex VNF service may be constructed of a master VNF and multiple dependent VNFs. Such a VNF may have an instruction set that defines a descriptor such as a virtual VNF link descriptor and a physical network function descriptor. These descriptors may describe the virtual and physical network requirements for the VNF. The instruction set may conform with an SLA and can describe links to use or avoid in the physical network based on the descriptor. The SLA can govern performance requirements for various tenants.

An orchestration service may be critical to ensure an execution of appropriate SLAs for tenants and end users that subscribe to a VNF service. For instance, a virtual evolved packet core ("EPC") service may be allotted to a set of subscribers as part of a 5G network slice. An example SLA may describe that the total end-to-end latency for traffic flows within the various components of a corresponding multi-part VNF may not exceed about 10 milliseconds.

At stage 110, a first VIM for a first region that is associated with a first IP prefix range, can receive a second IP prefix range that is associated with a second region having a second VIM. The first VIM can be hosted at a first site located in, or at least specifically servicing, the first region. Likewise, the second VIM can be hosted at a second site located in the second region. Each of the first and second sites may be constituted as a data center that includes physical computing, networking, and storage resources.

In one example, a slice-based network implementing the first and second VIMs may also implement, or be incorporated in, an Openstack® inter cloud resource federation ("ICRF") platform. The ICRF platform may be enabled upon cloud deployment of a slice-based network, at which time required artifacts for partner or host cloud entities are configured. An ICRF can provide an abstraction layer to hide interoperability and integration complexities from a provider and end users. However, a primary function of an ICRF can be to provide a service responsible for interconnecting multiple cloud instances in a general sense.

In a more specific application of an ICRF, a service provided by the ICRF may be responsible for interconnecting multiple network slices that are respectively hosted at sites that are geographically scattered. Each of the first and second sites that respectively host the first and second VIMs may be considered as part of a federation represented by the ICRF. Stage 110 can include the ICRF enabling communication between the first VIM and the second VIM as part of a region discovery process.

During the discovery process, the first and second VIMs can identify available regions or zones offered by peers that are part of the federation represented by an ICRF. The VIMs can either directly communicate as part of a federation intercommunication, or indirectly through a federation intercommunication between components at the first and second sites. In one example, as part of the region discovery process, the ICRF can provide each of the first and second VIMs with a list of available regions (also known as "availability zones"). Information provided through the intercommunication as part of the region discovery process may include IP prefixes mapped to each availability zone within the federation. In one example, information provided through the ICRF may be static.

The first VIM may be hosted in the first site which is a central data center located at location A in a first region, and the second VIM may be hosted at the second site which is a small data center located at location B in a second region. In one example, the first and second sites may be part of a Telco network. Each of the first and second VIMs can have a respective IP prefix range, which is a range of IP addresses that generate workloads (network traffic) managed by a particular VIM. An IP address range may be referred to as a subnet.

As an example of IP prefix information exchanged during the region discovery process, the first VIM can have an IP prefix range such as the 210.0.0.0/8 address range. This may indicate the first site caters to 5G workloads and VNFs for all subscriber traffic that belongs to that IP prefix range. Put another way, any workload that caters to the 210.0.0.0/8 subnet is hosted by, and therefore mapped to, the first site/first VIM. Similarly, the second site/second VIM may be mapped to a prefix range of 210.210.1.0/24, as an example. This indicates that an IP range for the second region is part of the/24 IP subnet. Accordingly, stage 110 implements a mapping out of sites within an Openstack® federation to IP addresses that are allocated for subscribers within each of the regions that include those sites.

Stage 120 can include the first VIM determining that a performance threshold associated with a first VNF of a network slice managed by the first VIM is violated. The performance threshold can correspond to a KPI which was specified in an SLA at the time the first VNF was onboarded (instantiated) by the first VIM.

In one example, a performance threshold monitored by the first VIM can be associated with allocated memory utilization to determine a load and utilization of allotted TCP buffers as defined in one or more SLAs for the first VNF. More specifically, as explained below, memory utilization of the first VNF can be monitored as a function of TCP window size, as it relates to actual throughput, in order to determine whether the first VNF is being exhausted by a current workload.

In one example, the first VNF can be a data plane VNF, such as an evolved packet core, that is configured to meet a specific maximum data plane throughput ("MDT"), as specified in a respective SLA. This means that a data plane of a slice incorporating the first VNF can provide only up to a throughput of the MDT due to limitations of respective processing resources.

To create a network slice with a given MDT requirement, transmission control protocol ("TCP") buffer size can be used as a reference point. More specifically, an allotted TCP buffer size of a service gateway ("SGW") and a packet data network gateway ("PGW") for a data plane of the network slice can be set sufficiently large so that data flow through the network slice can saturate an underlying data plane path and achieve a desired throughput (MDT for first VNF).

In one example, a VIM according to the present disclosure can continuously monitor actual throughput and latency for any VNF which it manages. Actual throughput for network traffic flowing to and from a VNF can be calculated according to the following algorithm:

$$\text{Throughput (bits/sec)} = \frac{TCP \text{ Window Size (bits)}}{\text{Latency (sec)}}$$

The above algorithm can be used, by the first VIM in particular, through a reverse calculation, to determine a current TCP window size, or to estimate an optimal TCP window size for the first VNF achieve a desired throughput. Further, by comparing a current TCP window size to an allotted buffer size for a network slice implemented the first VNF, the first VIM can determine a memory utilization for the first VNF.

An SLA that is defined for a network slice incorporating the first VNF can specify a maximum memory utilization for operations of the first VNF, such as a memory utilization is not to exceed 80%, for example. Thus, where a ratio of a TCP window size derived from an actual throughput relative to an allotted buffer size is greater than 0.8, the first VIM will determine the performance threshold is violated for the first VNF.

In another example, the first VIM can use an MDT as a benchmark against which it will modify a TCP window size for the first VNF so that an actual throughput meets or comes as close as possible to the MDT. As this management and modification of the TCP window size is implemented by the first VIM for the first VNF, the first VIM can monitor memory utilization for the first VNF.

As an example of the above, during a first operating period, a TCP window size for the first VNF may be a standard 64 KB TCP window size. Also, during this first period, a latency for the first VNF may be 30 milliseconds and a memory utilization may be 45%. However, a link between the first VNF and destination may be a 1 Gigabyte Ethernet (GbE) link. As a result, during a second operating period, the first VIM may modify the TCP window size based on a reverse calculation of the above equation to change window size for the first VNF to a 3750 KB TCP window. While this may achieve a 1 Gbps throughput with respect to first VNF, if the memory utilization is 85%, the 80% memory utilization performance threshold specified in the SLA for the first VNF will be violated.

At stage 130, the first VIM can map portions of a workload associated with the performance threshold to the first region and the second region based on workload flow data for each of the first and second IP prefix ranges. The workload flow data may include IPFIX records supplied to the first VIM by the first VNF, and which may provide source subnet traffic to total VNF traffic ratio data. In one example, a record (ratio value) may be provided for each subnet that is a source of network traffic for the VNF. In another example, a record may be provided for every IP address that is a source of network traffic, and records may be grouped according to subnets as reflected by the IP addresses.

Stage 130 can include the first VIM obtaining IPFIX records from the first VNF that it manages, and identifying source-to-first VNF traffic with respect to other regions including sites that are part of a federation including the first site. In particular, the first VIM can cross-reference the IPFIX records with the IP prefix range information obtained for other regions/sites in stage 110 for the federation including the first site. In turn, the first VIM according to the present disclosure can determine whether a local scale out of a first VNF instance, or a remote instantiation at another site will optimize a performance of a slice-based network it is incorporated in.

In another example, the IPFIX records can include other information regarding one or more VNFs including packets per second, actual throughput on ingress and egress interfaces, virtual CPU utilization, and other performance measurements.

At stage 140, the first VIM can instantiate a second VNF at the one of the first region and the second region having a workload portion corresponding a higher network resource consumption. As previously noted, network resource consumption may refer to a proportionality between: (A) a portion of total computing resources represented by the first VNF required to meet a demand of a total workload (total network traffic) generated from a plurality of regions; and (B) a portion of the total workload generated by (portion of total network traffic coming from) each region respectively.

The workflow data in the form of IPFIX records may include a mapping table that gets created at the first site and informs the first VIM of a list of IP subnets allocated to the second site that may include subnets A, B, C, D, and E, for example. With the IP prefix data, the first VIM can use the IPFIX records to know what region each subnet belongs to, and create a mapping that conveys that subscribers corresponding to IP addresses that are in a given region. Further, based on those subscriber workload contributions, the first VIM can know what amount of the workload can be attributed to each region.

From this, the first VIM can determine if a workload from any one region is more or less responsible for network traffic contributing to an SLA violation. The VIM can determine which region's workload is causing the first VNF to be overloaded. For example, the first VIM may be able to determine that most of the traffic originating from a particular subnet belongs to the second region. In that example, it is more advantageous to instantiate a local copy of that particular workload or VNF at the second site located at location B within the second region. In one example, an SLA for a VNF can be administered by the first VIM to establish that a foreign region (region that does not include the VIM) cannot contribute more than a specified percentage of a total workload for the VNF.

In stage 150, the method can include updating an assignment of portions of the workload to the first and second regions to ensure the performance threshold is not violated. In one example, the first VIM, having determined the assignments based on the mapping in stage 130, can record the assignments before providing them to an orchestration service.

At stage 160, an updated distribution of the workload based on the assignments can be implemented by the orchestration service. In one example, the orchestration service can update service chains with respect to each region contributing to the workload that cause the performance threshold violation with the first VNF. Service chaining can refer to a sequence of network services (such as firewalls, network address translation, intrusion protection, etc.) that are connected in a virtual chain. This can include updating a selector at a network ingress point regarding address locations of the VNF. The first VNF can be a destination where a CSP has deployed a complex network function and service. The service chains defined by the orchestration service can define where network traffic flows for various VNFs or stops in the service chain.

FIG. 2 illustrates a flowchart for an exemplary method for analyzing and distributing workloads to optimize performance of slice-based networks. A system according to the present disclosure can determine, with a VIM at a first region ("Region 1") that a performance threshold is violated at stage 210.

As noted above, a VIM may monitor a VNF with respect to actual throughput, latency, TCP window size, and memory utilization. The VIM can ensure these metrics meet performance thresholds, such as thresholds required in an SLA. More specifically, the VIM can be configured to manage network traffic flow to a physical resource for which a control plane is implemented by a virtual resource referred to as a PVNF.

In general, network slices usually comprise both the virtual and physical domains. It is also often the case that physical devices implement an architecture that allows a respective device to be configured as multiple partitions within a single chassis, each partition potentially providing a specific network function just as a VNF would. In one example, each partition could behave as an independent router, with its own dedicated control plane, data plane, and management plane. In another example, a set of physical ports may be allocated to a specific network slice and mapped to a virtualized control plane to create a logical representation of the device—a PVNF. This may enable an operator to run multiple services on a single physical device, while still maintaining operational isolation between the services.

At stage 210, the VIM can determine a violation has occurred for a performance threshold that is associated with a PVNF. The PVNF being configured to virtualize a control plane of an instance of a bare metal component, which makes up at least part of a bare metal device. The bare metal component can be provided by a line card. The violation can be detected, in one example, as a result of monitoring delay buffers (as a function of pack drops). A delay buffer can represent a maximum delay that can be tolerated on the line card. A threshold for a delay buffer may be specified by an SLA or derived from a manufacturer's specification.

In one example, a current value of a delay buffer is determined from packet drops. Packet drops can be monitored using a PVNF. As an example of the relationship between packet drops and a delay buffer, a 5 ms delay buffer would result in 5 ms of packet buffering on a line card.

Accordingly, any packet drops in excess of a normal limit corresponds to a delay buffer that is unacceptable. A normal prescribed or acceptable packet drops limit can be configured through VNF descriptors as part of a service creation process.

At stage 212, a VIM can process a performance threshold that has been violated in terms of the type of network component for which a violation has occurred. Based on the type of threshold violated, the method can include performing a sub-analysis for reassigning portions of a workload to existing or newly created resources of the slice-based network.

In one example, where a violated performance threshold is based on a throughput as derived from memory utilization in stage 212, a VIM can execute a first sub-analysis 220 for instantiating a VNF based on location ("first sub-analysis" or "VNF placement sub-analysis 220"). In another example, when the violated performance threshold is related to packet drops, the method can include executing a second sub-analysis 240 or a third sub-analysis 260 based on hardware availability. The second sub-analysis 240 can be executed when additional hardware resources are available for a PVNF for which the performance threshold is violated ("hardware allocation sub-analysis 240"). However, where hardware resources are not available, the third sub-analysis 260 may be executed to determine if the network currently includes virtual resources to which portions of a threshold-violating workload can be shifted ("redistribution sub-analysis 260").

The VNF placement, hardware allocation, and redistribution sub-analyses 220, 240, 260 can include a stage for assigning portions of the threshold violating workload to respective virtual or physical resources. An assignment generated from any of these sub-analyses can be provided to an orchestration service in stage 280, which updates a service chain for the workload.

At stage 222, the VNF placement sub-analysis 220 can include mapping a workload to regions of a slice-based network based on IP prefix range data from the VIMs. In one example, a VIM for Region 1 can receive IPFIX records from a VNF of Region 1 in stage 222. The VIM can use the IP prefix range data to group workflow data from the IPFIX records according to traffic source (region).

At stage 224, a VIM can determine a source region for the performance threshold violation. In one example, the VIM analyzes the mapped data from the IPFIX records to determine source traffic-to-total VNF traffic ratios for the workload causing the violation of the performance threshold. From a comparison of these ratios, the VIM can determine whether a home region (Region 1) or a foreign region disproportionately contributes to the workload. In one example, the VIM can determine that a percentage of a total workload that is contributed by a foreign region is greater than a threshold established in an SLA that defines the VNF. In this way, stage 224 of the method of FIG. 2 is analogous to aspects of stage 130 for the method of FIG. 1.

In stage 226, the results of stage 224 are processed in terms of whether Region 1 is the region to which the violation is attributed. At stages 228 and 330, the VIM can instantiate a VNF respectively in the same or a different region as the region hosting the VIM. In the case of stage 228, Region 1 is not the source region, and a VNF may be instantiated through communications between a VIM at Region 1 and a VIM at the source region. At stage 232, a portion of the threshold-violating workload can be assigned to the newly instantiated VNF.

The hardware allocation sub-analysis 240, on the other hand, can include allocating additional available physical resources to the PVNF in stage 242. Thus, after stage 242, the PVNF is an expanded and different version of itself (referred to here as "PNVF'"). At stage 244, the PVNF' can continue to service the threshold-violating workload.

In stages 246 and 248, a utilization of the PVNF' can be continuously evaluated to determine if a better workload distribution can be effected for the slice-based network operating at a steady state (with all SLAs being complied with). More specifically, at stage 246, a VIM can determine whether the PVNF' is at or substantially below a respective operating capacity. In another example, a policy and mediation layer incorporated as part of a VIM, or as separate resource, can make this determination. Essentially, it is determined whether the PVNF' is capable of having portions of a workload being handled by a corresponding VNF at the same site, offloaded onto the PVNF'.

Where a VIM determines that the PVNF' is being underutilized in stage 246, the VIM can assign portions of a workload serviced by the VNF, to the PVNF'. In one example, an SLA can define underutilization based on a threshold for maximum allowable packet drops. In one example, an SLA can specify that the PVNF' is being underutilized if packet drops are less than a KPI. The value for the KPI may be the same or different from the performance threshold for packet drops. In another example, packet drops for the PVNF' may have to be less than a KPI by a certain margin for a predetermined period of time.

Where the PVNF' is not being underutilized, it can be evaluated for overutilization in stage 248 as part of a feedback loop that includes stages 244 and 246. The feedback loop can be executed continuously as long the PVNF' is not under or over-utilized. However, in the event that it is determined that the PVNF' is being over-utilized, a VIM can determine if more physical resources are available at stage 214.

Regardless of the stage that precedes an evaluation preformed in stage 214, where additional physical resources are not available, a VIM can execute the redistribution sub-analysis 260. In particular, a VIM can poll a VNF in stage 262 to determine how much of a respective capacity for handling network traffic is being used. At stage 264, a VIM can determine whether available capacity attributed to the VNF is sufficient to result in a performance threshold for the PVNF not to be violated, or the PVNF' not to be overutilized.

Where the VNF does not have capacity to remedy current operating conditions (workload distributions), the VNF placement sub-analysis 220 can be performed. At stage 266, a system check determines if a location-based workload re-distribution is prioritized with respect to a VIM or site maintaining the VNF and the PVNF. In one example, a VIM may prioritize, according to one or more SLAs, speed over long term remediation of an operating condition that results in a violation of a performance threshold. For example, it may require less time to instantiate a VNF at the same site as the PVNF, even though traffic from another region may be a more significant contributor to the performance threshold violation.

In another example, long term remediation may hold priority, and thus, a VIM can cause a VNF to be instantiated in another region. Accordingly, even when a VNF associated with the PVNF or the PVNF's has capacity, a new VNF will be instantiated in foreign region that is closer to the source of a threshold violating workload. However, if the VNF has capacity and location-based workload redistribution is not prioritized, a portion of the workload causing a threshold violation or overutilization can be assigned to the VNF in stage 268.

FIG. 3 is an example sequence diagram for instantiating a VNF in a region having a higher network resource consumption related to a performance threshold violation. Accordingly, FIG. 3 illustrates an exemplary implementation of the VNF placement sub-analysis 220 of FIG. 2.

At stage 310 a discovery process for an Openstack® federation can be implemented. In one example, Openstack® sites of the type described below, and which host the VIMs, can use this process to discover the available regions or zones offered by peers that are part of a federation. In one example, an ICRF can provide each site with a list of available regions (also known as "availability zones") as part of the Region Discovery process implemented in stage 310. In one example, information from an ICRF may be amended to include IP prefixes mapped to each availability zone within an Openstack® site. In one example, information provided through the ICRF may be static.

More specifically, a first VIM ("VIM-1") can obtain an IP prefix range for a second VIM ("VIM-2"), and vice versa. The VIM-1 may be hosted by a first site that is part of an Openstack® federation and located in a first region. Whereas the VIM-2 may be hosted by a second site that is a part of the federation and located in a second region. The first and second regions can be geographically separated.

At stages 314 and 316, network traffic from first and second network ecosystems ("NES-1" and "NES-2") can be directed through the network to a first VNF ("VNF-1"). The combined network traffic received from the NES-1 and the NES-2 can define a workload, and reception of traffic from both ecosystems by the VNF-1 can define a first workload distribution ("WD-1").

A network ecosystem ("NES") may comprise a multitude of devices connected to a network, for example a 5G network, and generating traffic over that network. In one example, an NES may include mobile telephones, tablets, other computing devices, cars, IoT devices, and other end devices. Data from these end devices (network traffic) can be carried by a virtual service network ("VSN") that includes the VIM-1 and the VIM-2.

At stage 324, the VNF-1 can be executed for the WD-1. As previously noted, a VNF according to the present disclosure can host VMs, or represent virtual controllers, virtual routers, virtual interfaces, VLANs, or other virtualized network functions that run on top of physical hardware. Execution of a VNF can include providing a service that performs the functions of a physical or software component provided the appropriate data.

At stage 326, the VIM-1 can monitor performance of the VNF-1. In one example, performance thresholds for parameters such as data throughput, latency, bandwidth, round-trip time, and others can be defined in various SLAs that the VNF-1 must comply with. In another example, the VIM-1 can monitor TCP window size as a function of actual throughput while tracking memory utilization.

In stage 328, either the VNF-1 or the VIM-1 can determine that a performance threshold defined for the VNF-1 has been violated. In turn the VIM-1 can request IPFIX records from the VNF-1 in one example. In another example, the VIM-1 can continuously receive IPFIX records as part of monitoring the VNF-1's performance at stage 326. In one example, the VIM-1 may determine that a memory utilization for the VNF-1 is more than a threshold established by an SLA that defines the VNF-1.

In stage 332, the VNF-1 can transmit IPFIX records to the VIM-1. The IPFIX records can be specific to the WD-1, and breakdown the WD-1 according to IP addresses.

In stage 336, the VIM-1 can process the IPFIX records to map portions of the threshold violating workload to different regions or specific sites according to an amount of the workload that can be attributed to that region or site. More specifically, each IPFIX records entry may include an amount network traffic generated at a specific IP address. An IP address range can be included or derived from each IP address, and thus reveal a subnet in which a particular IP address is incorporated. Accordingly, in one example, the VIM-1 can use an IP address included in each IPFIX records entry to divide the workload into portions that can be respectively attributed to subnets for a slice-based network.

Each subnet can correspond to a physical region that hosts that subnet, and a site that services the region. As noted above, through the discovery process in stage 310, the VIM-1 received IP prefix ranges for multiple VIMs associated with sites within a federation including the VIM-1 and the VIM-2. Subnets identified from the IPFIX records, and attributed portions of a threshold violating workload, can be matched with, and thus mapped to, their corresponding sites using the IP prefix range information.

Using the subnet, in stage 340 the VIM-1 can determine that a portion of the workload generated by the NES-2 is a disproportionate cause for the violation of the performance threshold.

At stage 344, the VIM-1 can generate an instruction for instantiating a second VNF ("VNF-2"). At stage 346, the VNF-2 can be instantiated. In one example, the VIM-1 can cause the VIM-2 to instantiate the VNF-2, and therefore provide a second VNF at the site hosting the VIM-2, which is geographically closer to the NES-2. In another example, the VNF-2 may be identical to the VNF-1, for example in terms of an MDT and VNF-defining SLAs.

Concurrent with, or subsequent to, the instantiation of the VNF-2, at stage 348, the VIM-1 can devise a workload assignment for a second workload distribution ("WD-2") that includes the VNF-2. More specifically, the VIM-1 can inform an orchestration service where to direct portions of a workload previously distributed according to the WD-1.

In one example, an assignment for the WD-2 can specify all of the network traffic generated by the NES-2 is assigned to the VNF-2, and all of the network traffic generated by the NES-1 is assigned to the VNF-1. In another example, a site hosting the VIM-2 may not include sufficient computing resources to handle all of the network traffic generated by the NES-2 and remain compliant with a particular SLA with respect to the site. As a result, a portion of the NES-2 traffic can be still be directed to the VNF-1. For example, network traffic generated by particular devices that are part of the NES-2, such IoT devices operating with Region 2, may continue to be directed to the VNF-1. However, for the purposes of the example illustrated in FIG. 3, an entirety of the NES-2 is assigned to the VNF-2 pursuant to the assignment in stage 348.

At stage 352, the VIM-1 transmits a notification to the VNF-1 of a new service chain that is configured to implement the WD-2. Accordingly, the VNF-1 is notified of its respective workload following the performance threshold violation. In one example, the notification can serve as a trigger for the VNF-1 to refresh IPFIX records until it can recognize that the WD-2 has been implemented. In another example, where the WD-2 specifies that only traffic from the NES-1 will be directed to the VNF-1, the IPFIX records for the VNF-1 can be used by the VNF-1 or the VIM-1 to ensure a transition to the WD-2 is executed, otherwise a notification can be provided to the orchestration service.

At stage 354, the orchestration service can issue a service chain instruction to the NES-2 and the VIM-2 in response to receiving the workload assignment for the WD-2. The service chain instruction may specify that the NES-2 traffic will be directed to the VNF-2. In one example, the orchestration service can direct the network traffic and the instruction serves as a notification to the VIM-2. In another example, the instruction directs the VIM-2 to communicate directly, or through an associated communications hub, with elements in the NES-2 so that traffic generated by those devices is channeled to the VNF-2.

At stages 360 and 362, the WD-2 can be implemented by the slice-based network such that traffic from the NES-1 and the NES-2 is directed to the VNF-1 and the VNF-2 respectively. Subsequently, the VNF-1 and the VNF-2 can be executed at respective sites for the WD-2 at stages 366 and 370, respectively. In addition to the stages illustrated, the VIM-1 and the VIM-2 can continue to communicate through the Openstack® federation of which they are part. Thus, according to the present disclosure, cross-site visibility and access to resources managed at the level of the VIMs within a slice-based network, can be continuous, and used as a basis for distributing workloads based on physical locations of sources of network traffic and optimize overall network performance.

In another example not specifically illustrated in FIG. 3, stage 340 could alternatively include determining that a workload from the NES-1 primarily or disproportionately contributes to the violation of the performance threshold. Accordingly, instead of generating an instantiation instruction in stage 344, the VIM-1 can instantiate the VNF-2 at the site that hosts the VIM-1 and the VNF-1. Further, the VIM-1 can generate a workload assignment representing a third workload distribution ("WD-3") in stage 348. Transmission of the workload assignment from the VIM-1 informs the orchestration service that a portion of the NES-1 traffic will be directed to the VNF-1 and a portion will be directed to the VNF-2, which is hosted at the same site as the VNF-1.

FIG. 4 is an example sequence diagram utilizing available bare metal resources to address a performance threshold violation. Accordingly, FIG. 4 illustrates an exemplary implementation of the hardware allocation sub-analysis 240 of FIG. 2.

At stage 408, the NES-1 traffic flow can be directed to the VNF-1 as part of a fourth workload distribution ("WD-4"). At the same time, in stage 410, the NES-2 traffic flow for the WD-4 can be directed to a bare metal component. Command and control of the bare metal component can be implemented by the PVNF sitting on a site hosting the VNF-1. As noted above, the PVNF is a virtual resource configured to virtualize a control plane of bare metal component that constitutes at least a portion of a bare metal device At stage 414, the VNF-1 can be executed for the WD-4. Concurrently, at stage 416, the PVNF can execute in combination with operations by the bare metal component for the WD-4. At stage 420, the VIM-1 can monitor the performance of both the VNF-1 and the PVNF. In one example, the VIM-1 can monitor the PVNF for packet drops. In stage 422, the VIM-1 can determine a performance threshold has been violated for the PVNF.

Stage 426 includes the VIM-1 obtaining IPFIX records from both the VNF-1 and the PVNF. As described in more detail with reference to FIG. 6, in one example, IPFIX records from either the VNF-1 or the PVNF may be utilized once it is determined that a portion of the hardware allocated to the PVNF cannot be expanded. In one example, the IPFIX records from the PVNF can be referenced to determine the sources of network traffic that are primarily responsible for causing the performance threshold for the PVNF to be violated, based on the volume of traffic from those sources. This information can be used by the VIM-1 to perform the redistribution sub-analysis 260, and determine if the VNF-1 has capacity to take on this network traffic without violating its respective SLAs. Where it is determined that the VNF-1 cannot assume that portion of the workload, the IPFIX records from both the VNF-1 and the PVNF may be used by the VIM-1 to implement sub-analysis 220, which corresponds to the method illustrated in FIG. 3.

In stage 428, the VIM-1 can issue and transmit a violation notification and resource request to an SDN controller for the PVNF ("SDN"). Stage 432 can include the SDN controller determining that a portion of the bare metal device is available to expand the PVNF. In addition, the SDN controller can notify the VIM-1 that hardware resources can or will be added to the PVNF in stage 432.

Typical bare metal devices may include a plurality of line cards, interfaces, and physical ports on any gateway. As an example of the process the SDN controller may execute, a bare metal device corresponding to the PVNF may have ten (10) slots or line cards in a chassis, and a network slice implementing the VNF-1 and the PVNF may use the first five (5) line cards. Accordingly, particular ports on these five (5) line cards may be allocated for forwarding traffic between a first site and a second site, catering to IoT customers, or catering to connected car customers, or similar network functions. At the same time, the next five (5) line cards could operate to forward traffic for another group of subscribers, or one or more of these next five (5) line cards may not be being used.

At stage 436, the SDN controller can allocate a portion of available hardware that is sufficient to bring the PVNF in compliance with a respective SLA, and end a violation of the performance threshold.

Stage 440 can include the bare metal component communicating with the PVNF and implementing the now expanded portion of bare metal component allocated for the PVNF operations. Accordingly, the system is implementing a new version (PVNF') of the virtual resource that was previously handling network traffic at stage 416. A notification can be provided at stage 446 from the PVNF' to the VIM-1, as well as to the orchestration service, that informs the VIM-1 of the increased capacity of the PVNF'.

In stage 450, the orchestration service can broadcast to the NES-1 and the NES-2 that network traffic flow will continue as before. As a result of the broadcast in stage 450, the VNF-1 will receive traffic flow in stage 454 from the NES-1 for a new phase of the fourth workload distribution ("WD-4'") that mirrors the traffic flow for the original phase of the WD-4. Likewise, the PVNF' will receive network traffic flow in stage 456 from the NES-2 for the WD-4' that mirrors the traffic flow receive by the PVNF for the original phase of the WD-4. However, the PVNF' has the capacity to receive a respective workload without violating a performance threshold as a result of the allocation of available hardware to the bare metal component corresponding to the PVNF'.

As the VNF-1 and the PVNF' continue to be executed, the VIM-1 can continue to monitor the performance of each. In one example, the VIM-1 can determine in stage 460 that the PVNF' is being underutilized. In one particular example, the VIM-1 can specifically determine that delay buffers/packet drops for the PVNF' are well below a respective threshold.

As a result of this determination, the VIM-1 can either generate, or send a notification of the current operating state of the PVNF' to the orchestration service which can in turn generate, an assignment for a fifth workload distribution ("WD-5"). In this example, the monitoring leading to the determination in stage 460 indicated that the PVNF' is capable of increasing a respective workload without violating a performance threshold. Accordingly, the WD-5 may offload some of the workload on the VNF-1 that stems from the network traffic received from the NES-1 on to the PVNF'.

In the example illustrated in FIG. 4, the VNF-1, under the WD-4 and the WD-4', only receives network traffic flow from the NES-1. Accordingly, the PVNF' will have to receive some of the network traffic from the NES-1. The VIM-1 can access IPFIX records obtained from the VNF-1 in stage 426 in order to pinpoint what portions of the NES-1 should be offloaded onto the PVNF'. It will be understood that the VIM-1 can poll the VNF-1 at any time and update any IPFIX records from the VNF-1 with the most recent records.

In another example, the VNF-1 could receive network traffic from multiple NESs, and stage 464 may include determining how proportionally responsible each NES is for the total workload on the VNF-1. Further, the determination to offload network traffic currently serviced by the VNF-1, from one NES versus another NES, may be based on an additional capacity of the PVNF' and what proportion of total network traffic from any one of the NESs can be serviced by the additional capacity.

Stage 468 can include the orchestration service updating a service chain for, and issuing a service chain instruction to, the NES-1. The instruction being based on the workload assignment for the WD-5 that was obtained or generated by the orchestration service in stage 464. This may include the orchestration service providing an address or other information regarding the PVNF' that enables a portion of the traffic from the NES-1 to be forwarded to the PVNF'.

Following stage 468, designated portions of network traffic from the NES-1 are directed to the VNF-1 and the PVNF' in stage 472. At the same time, traffic from the NES-2 continues to be directed to the PVNF'. As shown in FIG. 4, the traffic flow from the NES-2 under the WD-5 mirrors the traffic flow under the WD-4. At stages 478 and 480, the VNF-1 and the PVNF' execute to process their respective network traffic flows under the WD-5.

FIG. 5 illustrates a schematic representing exemplary system components and communications between system components for analyzing and configuring workload distributions in slice-based networks based on workload proximity.

As illustrated, a first site 520 for a first region ("Region 1") can host a first VIM 522 ("VIM-1"). A second site 540 ("VIM-2") for a second region ("Region 2") can host a second VIM 542 ("VIM-2"). Each of the VIM-1 and the VIM-2 may communicate, or incorporate a policy and mediation layer to communicate with an orchestration service 516 (as indicated by the double-ended arrows extending between the orchestration service 516 and the first and second sites 520, 540). The orchestration service 516 can provide an orchestration platform, that together with the VIM-1 and the VIM-2, effect the performance of orchestration across emerging network services at a virtual level. In one example this orchestration may be performed automatically.

The VIM-1 and VIM-2 ("the VIMs") can be part of a slice-based VSN that implements an Openstack® federation 518. The VIMs can monitor received telematics data from network elements, and can each constitute one or more processes executing on a respective physical server. Each of the servers can be part of a respective management cluster that manages various operations on the slice-based network. In one example, each of the VIM-1 and the VIM-2 includes a virtual analytics engine, such as VMware®'s vRealize®, to monitor how VNFs (e.g., virtual machines) are performing in the VSN. In one example, each of the VIMs can also include a physical analytics engine, which can act as a physical underlay that analyzes performance of hardware in the network, such as switches.

In general, policy and mediation layers according to the present disclosure may use APIs to intercept requirements that come from an orchestration platform, or any other suitable platform. In one example, a policy and mediation layer may communicate with a VNF workload state machine (not shown) that create a unified view of a network service rather than creating disjointed workloads. In addition, a policy and mediation layer according to the present disclosure may represent a software module that sits below APIs and can intercept different API calls to perform appropriate functions.

In one example, a policy and mediation engine 524 for the VIM-1 may be embedded within the VIM-1. In another example, the policy and mediation engine 524 may represent a separate function at least because a VIM platform of the VIM-1 may not be proprietary. The VIM platform for the VIM-1 may include APIs 526, and both the VIM-1 and the policy and mediation engine 524 may transmit requests through each of the APIs 526. For example, to create a virtual network, the VIM-1 may use a network API. As another example, to create a compute request, the policy and mediation engine 524 may send a request through a compute API.

A policy and mediation engine 524 may be a part of the VIM-1, and be able use a virtualized set of resources to create work flows and VNFs. In one example, the policy and mediation engine 524 can serve as a unified access point for orchestration requests including virtual machine ("VM") based workloads. Resources that may be utilized for these purposes are depicted as clusters 525 in FIG. 5.

It will be noted that the second site 540 includes APIs, a policy and mediation layer, and clusters represented as similar to those of the first site 520. It will be understood that these components, as they relate to and function in coordination with the VIM-2, have the same or more capabilities and capacity as their respective counterparts for the first site 520.

In one example, the VIM-1 can determine if additional VNFs must be generated to service various workloads assigned to the first site 520. In another example, an orchestration service 516 can generate a request including a workload to create a VNF. The request may be transmitted from the orchestration service 516 to the VIM-1. With either type of initiation for generating a VNF, the VNF to be generated can include a master VNF and subordinates of the master VNF.

Once a new VNF is generated, the policy and mediation engine 524 may transmit a message to the VIM-1 indicating that a workload or VNF has been created. The message may further include information such as a cluster associated with the workload or VNF, an IP address, a MAC address, a logical port, and the like. The association can indicate that multiple subsets of a given VNF are part of a common service mesh or service function.

The first site 520 can service network traffic for a first 5G application ecosystem 510 ("NES-1") that includes various devices in Region 1. In particular, the VIM-1 can manage an execution of a first VNF 528 ("VNF-1") in servicing a first workload distribution ("WD-1"). The VNF-1 can also service network traffic from a second 5G application ecosystem 514 ("NES-2") that includes various devices in Region 2.

The VNF-1 can continuously, or upon request, transmit IPFIX records that characterizes sources of a workload it currently services, to the VIM-1. The VIM-1 can continuously monitor a performance of the VNF-1 for compliance with one or more SLAs. In particular, the VIM-1 can monitor a latency, throughput, bandwidth, round-trip time, and parameters associated with an implementation of the VNF-1. As part of the Openstack® federation, the VIM-1 may operate as part of a region discovery process for the federation. The discovery process may be executed on a scheduled or otherwise periodic basis, and can include VIMs hosted at other sites in other regions exchanging IP prefix ranges directly with one another. In the case of system components of FIG. 5, a first IP prefix range mapped to Region 1 can be stored with the VIM-1 and provided to the VIM-2 at the second site 540. The VIM-2 can transmit a second IP prefix range mapped to Region 2 to the VIM-1.

Accordingly, when the VIM-1 determines that a performance threshold for the VNF-1 has been violated, the IPFIX records can be checked against the IP prefix ranges for other regions, or sites within the same or other regions. With this, the VIM-1 can determine a source, at least with respect to subnets within the network, of a problematic portion of the threshold violating workload. The VIM-1 can use the source information to determine where a new VNF can be instantiated so that it is located at a site that is physically the closest to the problematic network traffic source. Said another way, the VIM-1 can use the source information to cause a new VNF to be instantiated at a site to which a problematic subnet is mapped, in order to bring the VNF-1 in compliance with its SLAs and optimize an overall performance of the network.

FIG. 5 illustrates two scenarios for which a VNF is instantiated in response to a performance threshold being violated with the VNF-1. In particular, a second workload distribution ("WD-2") may be assigned by the VIM-1 and transmitted to the orchestration service 516, after the VIM-1 communicates with the VIM-2 to cause the VIM-2 to instantiate a first version of a second VNF 550 ("VNF-2_V1").

The VNF-2_V1 can be instantiated in response to a determination that a problematic portion of the WD-1 is being generated from the NES-2. Accordingly, in order to optimize performance of the network, being the closer of the two sites to the problematic workload portion, the optimal location for instantiating a new VNF is the second site 540. The new VNF can thus service the network traffic from the NES-2 and relieve this workload from the VNF-1. As a result of the VIM-1 communicating the assignment for the WD-2 to the orchestration service 516, the orchestration service 516 will update a service chain for the NES-2, and push down the updated service chain to the second site 540 and the NES-2. The delivery of the updated service chain causing the implementation of the WD-2, and thus transmission of network traffic for the NES-2 to the VNF-2_V1. The service chain for the NES-1 remains unchanged.

In another scenario illustrated in FIG. 5, a third workload distribution ("WD-3") may be assigned by the VIM-1 and transmitted to the orchestration service 516, after the VIM-1 instantiates a second version of a second VNF 560 ("VNF-2_V2"). The VNF-2_V2 is instantiated in response to a determination that a problematic portion of the WD-1 is being generated from the NES-1.

It will be noted that each of the WD-2 and the WD-3 are explained as a mutually exclusive replacement for the WD-1. However, instances of performance threshold violations in the future could cause a situation where the WD-2 and the WD-3 are implemented concurrently. For example, subsequent to an implementation of the WD-2 in which the VNF-2_V1 is instantiated, the workload generated by the NES-1 and serviced by the VNF-1 could increase to the point the VNF-1 is no longer in compliance with a respective SLA. Accordingly, the second version of the VNF-2 (VNF-2_V2) can be instantiated at the first site 520 such that the VNF-1 and the VNF-2_V2 split or otherwise take a portion of the workload for the network traffic from the NES-1.

FIG. 6 illustrates a schematic representing exemplary system components and communications between system components for analyzing and configuring workload distributions in slice-based networks based on an optimization of virtual and hardware resources.

The first and second sites 520, 540 along with the VIM-1 and the VIM-2 are illustrated in FIG. 6 and include at least their respective components as provided in FIG. 5. The first site 520 additionally includes a PVNF 610, a bare metal device 614, and an SDN controller 618 for coordinating the allocation of hardware resources from the bare metal device 614 for the implementation of the PVNF 610. In one example, the bare metal device 614 may be a mobile gateway as shown, which includes multiple slots, each slot configured to receive a line card. However, one of ordinary skill in the art will recognize that other devices may be provided for the bare metal device 614.

A fourth workload distribution ("WD-4") is illustrated in FIG. 6 as including network traffic from the NES-1 being service by the VNF-1, and network traffic from the NES-2 being serviced by the PVNF. A second version of the fourth workload distribution ("WD-4'") is depicted to illustrate a scenario in which a performance threshold violation occurs with the PVNF 610, and additional hardware resources are available from the bare metal device 614. Accordingly, the WD-4' is the same as the WD-4, the difference being the PVNF 610 is expanded to provide a new version of itself ("PVNF' 610") in order to bring operations into compliance with the SLA which specified the performance threshold that was violated.

In another scenario illustrated in FIG. 6, a portion of a workload from the NES-1 can be offloaded from the VNF-1 before or after the WD-4' is implemented. This fifth workload distribution ("WD-5") will require the VIM-1 to create a new assignment that will be communicated to the orchestration service 516, which will push down a new service chain to the NES-1. This will cause portions of the workload from the NES-1 to be directed to the VNF-1 and the PVNF/PVNF' 610.

Although not illustrated as receiving workloads in FIG. 6, either of the VNF-2_V1 or the VNF-2_V2 may be instantiated for either scenario instead of the implementing the WD-4' and the WD-5 respectively. More specifically, where a performance threshold is violated by the PVNF 610, no additional hardware is available, and the VNF-1 is unable to assume a required workload, one of the versions of the second VNF can be instantiated. A criterion for instantiating a new VNF at the first site 520 or the second site 540 discussed for FIG. 5, can be used in the same manner to address the threshold violation occurring with the PVNF 610.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for optimizing performance of a slice-based network comprising:
    receiving, by a first virtual infrastructure manager ("VIM") for a first region that is associated with a first internet protocol ("IP") prefix range, a second IP prefix range that is associated with a second region having a second VIM;
    determining, by the first VIM, that a performance threshold associated with a first virtual network function ("VNF") of a network slice is violated;
    mapping, by the first VIM, portions of a workload associated with the performance threshold to the first region and the second region based on respective workload flow data associated with each of the first and second IP prefix ranges; and
    generating, by the first VIM, instructions to instantiate a second VNF at one of the first region and the second region having a workload portion corresponding a higher network resource consumption.

2. The method of claim 1, wherein the first region is located in a geographical location different from the second region, and wherein a parameter for the performance threshold is a memory utilization for the first VNF.

3. The method of claim 2, the method further comprising:
    monitoring, by the first VIM, a throughput and a latency for the first VNF;
    deriving, by the first VIM, a transmission control protocol ("TCP") window size from the throughput; and
    determining the memory utilization according to a buffer size of the network slice and the TCP window size, wherein the memory utilization is used to determine the performance threshold is violated.

4. The method of claim 1, wherein the performance threshold associated with the first VNF is a second performance threshold, the method further comprising:
    determining, by the first VIM, that a first performance threshold is violated, the first performance threshold being associated with a virtual resource ("PVNF") for the first region that executes a control plane for at least a portion of a bare metal device; and
    determining, by the first VIM, whether additional hardware resources exists for the PVNF,
    wherein determining the second performance threshold is violated is:
        performed in response to there being a lack of additional hardware resources, and
        based on an estimated workload on the first VNF that would be required to ensure the first performance threshold is not violated.

5. The method of claim 4, wherein the first performance threshold is based on packet drops on physical interfaces of the bare metal device in a path of the network slice.

6. The method of claim 1, wherein the mapping includes:
    obtaining, with the VIM, IPFIX records from the first VNF; and
    identifying, by the VIM, source-to-VNF traffic for the first VNF based on the IPFIX records.

7. The method of claim 1, further comprising:
    updating, with the first VIM, an assignment of the portions of the workload to the first and second regions to ensure the performance threshold is not violated; and
    implementing, with an orchestration service for the slice-based network, an updated distribution of the workload based on the assignment.

8. A non-transitory, computer-readable medium containing instructions that, when executed by a hardware-based processor, performs stages for optimizing performance of a slice-based network, the stages comprising:
    receiving, by a first virtual infrastructure manager ("VIM") for a first region that is associated with a first internet protocol ("IP") prefix range, a second IP prefix range that is associated with a second region having a second VIM;
    determining, by the first VIM, that a performance threshold associated with a first virtual network function ("VNF") of a network slice is violated;
    mapping, by the first VIM, portions of a workload associated with the performance threshold to the first region and the second region based on respective workload flow data associated with each of the first and second IP prefix ranges; and
    generating, by the first VIM, instructions to instantiate a second VNF at one of the first region and the second region having a workload portion corresponding a higher network resource consumption.

9. The non-transitory, computer-readable medium of claim 8, wherein the first region is located in a geographical location different from the second region, and wherein a parameter for the performance threshold is a memory utilization for the first VNF.

10. The non-transitory, computer-readable medium of claim 9, the stages further comprising:
    monitoring, by the first VIM, a throughput and a latency for the first VNF;
    deriving, by the first VIM, a transmission control protocol ("TCP") window size from the throughput; and
    determining the memory utilization according to a buffer size of the network slice and the TCP window size, wherein the memory utilization is used to determine the performance threshold is violated.

11. The non-transitory, computer-readable medium of claim 8, the stages further comprising:
    determining, by the first VIM, that an other performance threshold is violated, the other performance threshold being associated with a virtual resource ("PVNF") for the first region that executes a control plane for at least a portion of a bare metal device; and
    determining, by the first VIM, whether additional hardware resources exists for the PVNF,
    wherein determining the performance threshold associated with the first VNF is violated is:
        performed in response to there being a lack of additional hardware resources, and
        based on an estimated workload on the first VNF that would be required to ensure the first performance threshold is not violated.

12. The non-transitory, computer-readable medium of claim 11, wherein the first performance threshold is based on packet drops on physical interfaces of the bare metal device in a path of the network slice.

13. The non-transitory, computer-readable medium of claim 8, wherein the mapping includes:
the VIM obtaining IPFIX records from the first VNF; and
the VIM identifying source-to-VNF traffic for the first VNF based on the IPFIX records.

14. The non-transitory, computer-readable medium of claim 8, the stages further comprising:
updating, with the first VIM, an assignment of the portions of the workload to the first and second regions to ensure the performance threshold is not violated; and
implementing, with an orchestration service for the slice-based network, an updated distribution of the workload based on the assignment.

15. A system for optimizing performance of a slice-based network, the system comprising:
a memory storage including a non-transitory, computer-readable medium comprising instructions; and
a computing device including a hardware-based processor that executes the instructions to carry out stages comprising:
receiving, by a first virtual infrastructure manager ("VIM") for a first region that is associated with a first internet protocol ("IP") prefix range, a second IP prefix range that is associated with a second region having a second VIM;
determining, by the first VIM, that a performance threshold associated with a first virtual network function ("VNF") of a network slice is violated;
mapping, by the first VIM, portions of a workload associated with the performance threshold to the first region and the second region based on respective workload flow data associated with each of the first and second IP prefix ranges; and
generating, by the first VIM, instructions to instantiate a second VNF at one of the first region and the second region having a workload portion corresponding a higher network resource consumption.

16. The system of claim 15, wherein the first region is located in a geographical location different from the second region, and wherein a parameter for the performance threshold is a memory utilization for the first VNF.

17. The system of claim 16, the stages further comprising:
monitoring, by the first VIM, a throughput and a latency for the first VNF;
deriving, by the first VIM, a transmission control protocol ("TCP") window size from the throughput; and
determining the memory utilization according to a buffer size of the network slice and the TCP window size, wherein the memory utilization is used to determine the performance threshold is violated.

18. The system of claim 15, wherein prior to determining the performance threshold is violated, the stages further comprising:
monitoring a memory utilization of the first VNF;
deriving a buffer size from the memory utilization; and
determining the data throughput according to the buffer size and a latency of the network slice.

19. The system of claim 15, the stages further comprising:
determining, by the first VIM, that an other performance threshold is violated, the other performance threshold being associated with a virtual resource ("PVNF") for the first region that executes a control plane for at least a portion of a bare metal device; and
determining, by the first VIM, whether additional hardware resources exists for the PVNF,
wherein determining the performance threshold associated with the first VNF is violated is:
performed in response to there being a lack of additional hardware resources, and
based on an estimated workload on the first VNF that would be required to ensure the first performance threshold is not violated.

20. The system of claim 15, wherein the mapping includes:
the VIM obtaining IPFIX records from the first VNF; and
the VIM identifying source-to-VNF traffic for the first VNF based on the IPFIX records.

* * * * *